H. WATKEYS.
Car Axle.

No. 201,726. Patented March 26, 1878.

Witnesses:
E. Bendixen
J. C. Laass

Inventor:
Henry Watkeys
by E. Laass his Atty.

UNITED STATES PATENT OFFICE.

HENRY WATKEYS, OF SYRACUSE, NEW YORK.

IMPROVEMENT IN CAR-AXLES.

Specification forming part of Letters Patent No. 201,726, dated March 26, 1878; application filed February 9, 1878.

*To all whom it may concern:*

Be it known that I, HENRY WATKEYS, of the city of Syracuse, State of New York, have invented new and useful Improvements in Car-Axles, of which the following, taken in connection with the accompanying drawing, is a full, clear, and exact description.

This invention relates to a novel method and means of mounting railway-truck wheels loosely on their axles, so as to allow them to revolve independent of their respective fellow wheels, and thus overcome the friction incident to wheels fixed stationary on their axle when traversing around curves, or when of different diameters.

Figure 1:
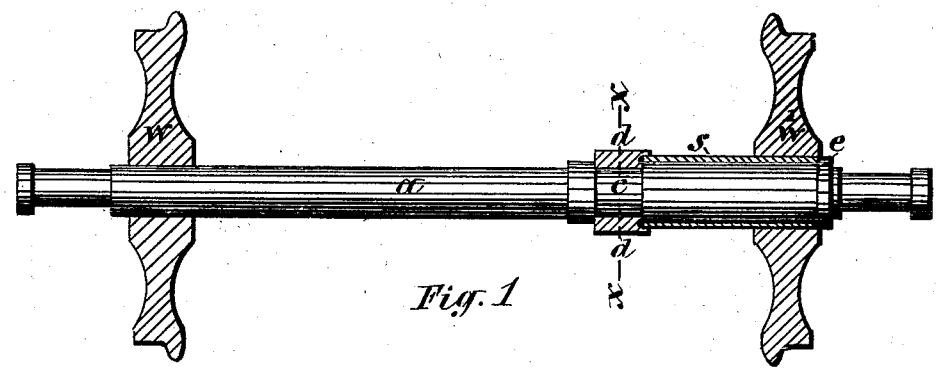
Figure 4:
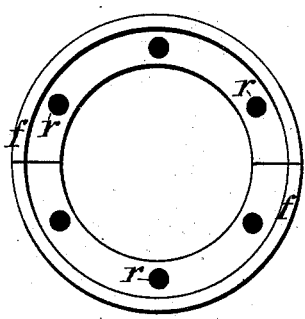
Figure 2:
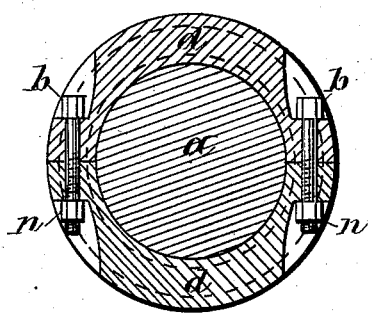
Figure 3:
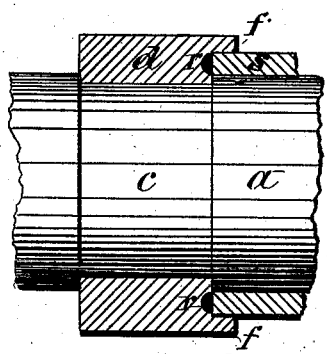

In the accompanying drawing, Figure 1 is a longitudinal section of an axle and wheels showing my invention; Fig. 2, an enlarged transverse section on line $x\,x$ of Fig. 1; Fig. 3, an enlarged longitudinal section of the device which resists the inward strain of the loose wheel; and Fig. 4, a face view of same, showing its bearing for the end of the sleeve which carries the loose wheel.

Similar letters of reference indicate corresponding parts.

$a$ represents the axle of either a car or a locomotive-tender truck; $w$, the wheel rigidly attached thereto, and $w'$ the wheel which is allowed to revolve on the axle. Various devices have been resorted to to impart this capability to the last-mentioned wheel without depriving it of its requisite strength and rigidity in other respects; and it is the object of this invention to accomplish this end by means which shall be simple in construction, durable, reliable and safe in their operation, readily applied, and easily repaired.

For this purpose I provide the wheel $w'$ with a rearward-extending sleeve, $s$, rigidly attached thereto; or the sleeve may be formed as an extension of the hub, fitted to the periphery of the axle, and of proper length to give it sufficient bearing on the axle and thoroughly brace the wheel in its vertical position. A collar, $e$, permanently attached to the axle outside of the wheel, braces the same against outward pressure, and a collar, $d$, rigidly secured to the axle at the rear end of the sleeve, and abutting against the same, resists the inward strain of the wheel $w'$, thus confining it to the gage of the track.

For the purpose of simplifying and reducing the cost of the construction of this arrangement, and also of facilitating the applicability and the repairs of same, I provide the axle with a circumferential recess, $c$, directly at the rear of the sleeve $s$, into which recess I fit a collar constructed of two longitudinal sections, clamped to each other by means of bolts $b$, which pass loosely through one of the sections, and engage screw-threads in the other, and, if desired, may be provided with jam-nuts $n$ at their ends, as illustrated in Fig. 2 of the drawing. This collar is of sufficient thickness to receive the end of the sleeve and have a circumferential flange, $f$, overlapping the same, for the purpose of excluding dust from the bearings of the sleeve. $r\,r$ are a series of anti-friction metal bearings secured in the face of the collar adjacent to the sleeve or tube, which bearings can be readily renewed, or an additional anti-friction metal ring applied thereto whenever it is deemed necessary, or is required to compensate for any abrasion that may be caused by friction of the respective bearing-surfaces, thus rendering the wheel adjustable in its bearings, and maintaining it in its proper gage.

To still further facilitate the applicability of my improvements, I construct the sleeve $s$ of a heavy metal tube, and press the wheel $w'$ onto the end of same by means of a powerful wheel-press, such as is usually employed for applying ordinary truck-wheels rigidly to their axle. The collar $e$, in this case, is to be of as small or smaller diameter than the sleeve, so as to allow the wheel $w'$ to pass over it and be pressed onto the sleeve while held by the collar $d$, and thus obviate the necessity of removing the wheel $w$ for that purpose.

It is obvious that the bearings of the sleeve admit of the usual arrangement for lubricating the same.

Having thus described my invention, I claim as new and desire to secure by Letters Patent—

1. The sleeve $s$, fitted between collars $e$ and $d$, rigidly attached to the axle, the collar $e$ at its outer end having a smaller circumference than the exterior of said sleeve, and the wheel $w'$ pressed onto the latter, substantially as described, for the purpose specified.

2. The combination and arrangement of the wheel $w'$, provided with sleeve $s$, the axle $a$, having rigid collar $e$ at the outside of said wheel, and the circumferential recess $c$ at the inner end of the sleeve, the collar $d$, constructed of two longitudinal sections clamped in said recess by bolts $b$, and provided with the circumferential flange $f$ and anti-friction metal bearings $r$, all constructed and combined substantially in the manner specified and shown, for the purpose set forth.

HENRY WATKEYS.

Witnesses:
E. BENDIXEN,
I. C. LAASS.